United States Patent Office 3,804,781
Patented Apr. 16, 1974

3,804,781
EXTRUDED ALUMINA CATALYST SUPPORTS
Joseph Dennis Colgan, Fort Worth, Tex., assignor to American Cyanamid Company, Stamford, Conn.
No Drawing. Filed July 28, 1972, Ser. No. 276,199
Int. Cl. B01j 11/06
U.S. Cl. 252—463      9 Claims

ABSTRACT OF THE DISCLOSURE

A process for obtaining alumina extrudates with improved porosity is disclosed which comprises adding a small amount of a surface active agent to hydrous alumina immediately before or after partial drying thereof and before extrudate formation from the partially dried alumina.

---

This invention relates to a process for preparing an alumina extrudate of improved porosity. More particularly, the invention relates to a process for preparing catalyst materials based on alumina extrudates whereby improved porosity is obtained by addition of surface active agent in the preparative medium.

High purity aluminum oxide, alumina, exhibits excellent qualities as a catalyst material and is widely used as a support for various promoters, such as metals of Groups V, VI, VII, and VIII of the Periodic Table. By "catalyst material," as that term is employed herein, is meant catalyst supports or base material or final catalysts.

Hydrous alumina is conventionally and readily formed by precipitating aluminum hydroxide from salt solutions. The hydrous alumina may be converted to a dry powder with varying degrees of hydration by heating to drive off water. Alumina when formed in this manner is extremely porous and has a high surface area both of which properties make it particularly suitable for use as a catalyst support. Fine alumina powder per se, however, is not suitable for use in a catalyst bed because of the high pressure drops encountered by the close packing of the fine powder and the difficulty in preventing loss of the fine powder in most uses. It has generally been necessary to employ alumina, or composites containing alumina, in the form of large particles to form suitable catalyst beds. One method useful in forming large particles is that of extrusion, whereby particles of mesh size in the range of $\frac{1}{32}$–1 inch can be obtained.

In conventional extrusion procedures, alumina powder, either hydrated or calcined, is mixed with water and other extrusion aids to form a mix of the proper consistency for extrusion. Promoter materials, such as salts or salt solutions of metal promoters, may be added to the alumina in conjunction with the extrusion procedure, if desired, or, usually more preferable, the promoter materials may be subsequently impregnated onto the formed extrudates. A conventional screw type machine is used to extrude the mix through a die plate with orifices of the desired size. The strands formed upon extrusion are cut to the desired length and then dried and calcined. From the point of view of effective catalyst performance, it is desirable to obtain a catalyst material possessing both high porosity and high strength. To some extent, high porosity, which reflects low density, is associated with weak mechanical structure or particles of low strength. Some compromise is therefore necessary between values of strength and density, although it is possible in some instances to improve strength for a given level of porosity.

Many methods are known and used to control the density of alumina extrudates. Generally, these methods involve variation of the volatile content of the extrusion mixes and of the extrusion procedure so as to obtain a variation in the degree to which the freshly formed alumina extrudate shrinks upon subsequent drying and calcining steps. The volatile content of the extrusion mix may be increased, usually resulting in an increase in porosity, by the addition of water. Shrinkage may be varied, for example by employing different alumina hydrates in varying concentrations in the extrusion mix. Shrinkage can also be varied by adjusting the rate of drying and the calcination conditions.

All of the above procedures have limited utility and no one procedure is effective for the wide range of situations possible. In addition to making a compromise between extrudate porosity and strength, there is also the requirement for proper consistency of the mix for extrusion. That is to say, use of too little or too much volatiles in the mix prepared renders the mix unextrudable, i.e. too viscous or too fluid for proper processing, and, therefore, the requirements as to consistency of the extrusion mix further limit the range over which porosity, or density, can be varied. Use of different alumina hydrates, or for example, alumina powder of specific particle size or density, may also complicate the manufacture of extrudates by imposing additional limitations on the composition of the mix to be extruded. In addition, variations in drying rates can only offer a limited change in porosity values and excessive increases in drying rates can result in destruction of the extrudates, i.e. loss of the desired form for which extrusion was effected.

In accordance with the present invention, there is provided a process for preparing alumina extrudates of improved porosity which involves adding to the hydrous alumina being processed at a proper point in processing an effective amount of a surface active agent and proceeding to prepare the extrudates in accordance with procedures that are otherwise conventional. The process comprises forming a hydrated alumina, filtering and washing the alumina, partially drying the washed alumina, extruding the partially dried alumina, and thereafter drying and calcining the extrudate, with the provision that at a point subsequent to filtering and washing the alumina but prior to extrusion of the partially dried alumina, there is added to the alumina being processed from about 0.5 to 10 weight percent of a surface active agent based on the weight of said alumina. Stated differently, in accordance with the present invention the surface active agent is added at a point in the processing which is either immediately before the partial drying step or follows the partial drying step before the extrusion step is effected. Addition of the surface active agent at either of these two precise points in processing enables the advantages of the present invention to be achieved. Thus, although variation in processing is possible, the specific points at which addition of surface active agent must be made are definite.

The process of the present invention in one embodiment enables the porosity of the extrudates to be more than doubled in specific instances compared to comparable extrudates obtained without provision for surface active agent. Although the increase in porosity is accompanied by a decrease in crush strength of the extrudate, the actual crush strength values of the extrudates obtained are entirely satisfactory for extrudates of the specific porosity values achieved. Extrudates of the present invention exhibit minimal shrinkage of their external dimensions upon subsequent drying and calcining compared to conventional extrudates, thus resulting in a greater degree of internal structure modification, or increased pore formation. Although the use of surface active agents as contemplated by the present invention effects the particular extrudate modifications discussed above, such use does not otherwise have any adverse effects on the physical or catalytic properties of catalyst materials obtained.

In another embodiment of the present invention, the total porosity of the extrudate may be maintained at the value normally obtained without the addition of surface active agent while the pore size distribution is changed to that having a greater number of larger pores as reflected by increased oil penetration of the extrudates compared to conventional extrudates of similar composition. This embodiment provides improved performance of the catalyst materials by providing increased oil penetration at levels of porosity that do not exceed limitations of specific materials as well as provides satisfactory oil penetration at levels of porosity where density and crush strength are at specific values.

In carrying out the process of the present invention, a hydrous alumina is first prepared in accordance with conventional procedures. Atlhough it is possible to incorporate minor amounts of other inorganic hydrous oxides, such as up to about 10 weight percent of silica, for example, in the hydrous alumina employed, it is generally preferred to employ alumina solely as the inorganic hydrous oxide. Processes for preparing hydrous alumina are well known in the art and such processes are useful to prepare the present hydrous alumina. A preferred procedure is to precipitate alumina from aqueous solutions of aluminum compounds, such as by adding a solution of aluminum sulfate to a solution of sodium aluminate to obtain the desired precipitated alumina in hydrous form. Adjustment of the slurry pH and aging of the precipitate are in accordance with conventional procedures.

After the hydrous alumina precipitate has been obtained in desired form, it is next subjected to filtering and washing to remove undesired ions, usually sodium and sulfate ions. Filtering and washing is carried out until the ion content is reduced to a satisfactory level. Modification of the slurry pH may be made in conjunction with filtering and washing, if desired, by addition of suitable acids or bases, such as nitric acid or ammonium hydroxide. Several stages of filtering and washing may be carried out as necessary.

After filtering and washing is complete, the next processing step, according to the present invention, must be one of two optional steps. One option is to partially dry the alumina prior to adding the surface active agent. Drying can be effected in conventional manner, such as by spray drying or oven drying, so long as there remains at least some free water in the dried alumina obtained. The remaining water is best ascertained by determining the loss on ignition of the dried alumina in accordance with standard test procedures. The value determined as loss upon ignition should be at least about 20% by weight of the alumina tested and preferably is at least about 25% by weight. The minimum amount of drying that is appropriate will vary depending upon the specific alumina involved but is generally sufficient to increase the $Al_2O_3$ content of the hydrate by at least 25% that of the original hydrate and preferably is sufficient to increase the $Al_2O_3$ content by 50% or more. For example, where a filter cake has an alumina content of about 18% by weight, it is desirable to obtain a partially dried hydrate which has an $Al_2O_3$ content of from about 22.5% or more, preferably of 27% or more. If a drying procedure other than spray drying is employed, it is desirable to maintain the drying alumina under agitation so as to achieve homogeneity in the partially dried product.

Once the drying step has been carried out, the partially dried alumina is prepared as an extrusion mix according to conventional procedures. In such procedures, a suitable amount of water is added to the partially dried alumina and effective mixing is carried out so as to achieve and extrusion mix of the proper consistency for extrusion. Various additives may be employed, if desired, as extrusion aids. A necessary additive, in accordance with the present invention, is a surface active agent. Generally such agent is added in the form of a solution. Suitable mixing should be carried out so as to ensure uniform distribution of the surface active agent throughout the extrusion mix. The amount of surface active agent added may vary widely depending upon the nature of the particular agent employed and the extent to which porosity increases are desired. Generally, a range of about 0.5% to 10%, by weight, based on the weight of alumina in the mix being processed is useful. Lower amounts generally do not effect any significant improvements in porosity while higher amounts tend to be wasteful since a leveling-off point is reached in porosity increases. It is generally preferable to use the surface active agent in amounts of about 1% to 5%, by weight, based on the weight of alumina in the mix.

In the second option, addition of the wetting agent is to the filtered and washed alumina prior to drying. In such procedure, the filter cake resulting from filtering and washing is reslurried with water and the requisite amount of surface active agent is added thereto, said requisite amount being that previously specified with respect to the first option. After mixing thoroughly, the slurry is subjected to drying using the procedures described with respect to the first option.

The second option discussed above is particularly adaptable to, but not limited to, those extrusion mixes which have a high volatile content and normally yield extrudates of relatively low porosity. In such instances, it is sometimes desirable to add a flocculant to the alumina slurry to aid in filtration and to increase viscosity. The fluocculant and surface active agent are carried over after the partial drying into the extrusion mix subsequently prepared wherein the flocculant aids in obtaining the proper consistency for extrusion and the surface active agent provides the improved porosity in the final extrudates.

As surface active agents that can be employed in the process of the present invention are included any of the well known cationic, anionic, nonionic, and amphoteric types that are water-soluble. The choice of surface active agent as well as the particular amount thereof employed enable a wide range of porosity improvements to be effected. Some effect on the porosity improvement obtained will also be influenced by whether the alumina is partially dried before or after addition of the surface active agent. For example, when the alumina is dried prior to treatment with surface active agent, certain surface active agents provide greater improvements in porosity than other agents. As another example, when the alumina is dried after treatment with surface active agent, nonionic agents provide greater improvements in porosity than anionic agents. This anomalous behavior with respect to particular types or surface active agents is entirely unpredictable and is indicative of the unexpected nature of the present invention.

The general categories of the various surface active agents of a particular class are discussed in Surface Chemistry, L. I. Osipow, Reinhold Publishing Corp., New York, N.Y. (1962), in Chapter 8, entitled Surfactants, pages 144–162. Individual members of the various categories of surfactant types are readily available commercially from numerous suppliers. To characterize a commercial product one merely needs to know the tradename under which it is sold. Reference is then made to McCutcheon's Detergents and Emulsifiers, published by Allured Publishing Corp., Ridgewood, N.J. (1971) to establish the particular type and identity of the surfactant in question.

Typical of useful cationic surface active agents which may be employed are included long chain primary, secondary, and tertiary amines and acid salts thereof such as octadecyl amine salts; N-ethyl, N-heptadecylamine salts; N-diethyl, N-dodecylamine salts; N-dodecyl-1,3-propylenediamine; polyoxylated amines; polyoxylated diamines and quaternary ammonium compounds such as N-trimethyl, N-octadecylammonium chloride; N-stearamidopropyl, N-dimethyl, N,β-hydroxyethyl ammonium chloride; N-octadecyl, N-dimethyl, N-benzylammonium chloride; and the like. Typical of useful anionic surface active agents which may be employed are the oleic acid amide of the sodium salt of methyl taurine, the tall oil acid amide of the sodium salt of methyl taurine, the palmitic acid amide of the sodium salt of methyl taurine, the oleic acid ester of sodium isethionate, the coconut oil acid ester of sodium isethionate, the palmitic acid amide of the sodium salt of cyclohexyltaurine, di-n-decyl sodium sulfosuccinate, di-2-ethylhexyl sodium sulfosuccinate, di-2-methylamylsodiumsulfosuccinate, diamylsodium sulfosuccinate, disodium octadecylsulfosuccinamate, tetrasodium octadecylsulfosuccinamate-N-succinic acid, 2-ethylhexyl sodium sulfate, 1-methyl-4-sodium, sulfate-7-ethylundecane, 3-ethyl-6-sodium sulfate-9-ethyltridecane, sodium nonylphenoxyethylsulfate, sodium octylphenoxyethoxyethylsulfate, and the like. Typical of nonionic surface active agents which may be employed are fatty alkanolamides such as the lauric acid amide of diethanolamine, octylphenol modified with ten moles of ethylene oxide, nonylphenol modified with ten moles of ethylene oxide, and the various polyoxyethylene derivatives of fatty alcohols and acids. Typical of amphoteric surface active agents are N-3-carboxypropyl octadecylamine, sodium salt; 1-hydroxy, 1-(2-hydroxy ethyl), 1-(2-carboxyethyl), 2-octadecyl imidazoline, disodium salt; 1-dodecylsulfate, 1-(2-hydroxyethyl), 1-(2-carboxyethyl), 2-octadecylimidazoline monosodium salt; and the like.

After the alumina has been partially dried, it is next subjected to extrusion. If the modification with surface active agent was effected prior to drying, the dried alumina may be processed directly to extrusion. If modification with surface active agent was not accomplished prior to drying, such modification must be effected in conjunction with extrusion. The particular extent to which the alumina is dried will influence preparation of the extrusion mix. Generally, the volatile content of the extrusion mix will be in the range of about 50 to 80%, preferably between about 60% and 70%, by weight, based on the total weight of the extrusion mix. By "volatile content" is meant free water and other materials which are volatilized from the extrudates during subsequent drying and calcining. Generally the volatile content is primarily water, but other processing aids may be employed which can add to the volatile content. The extrusion is carried out in conjunction with conventional procedures for extruding partially dried alumina. Such procedures involve preparation of an extrusion mixture of suitable consistency for extrusion using the conventional screw type machines available for this purpose. The partially dried alumina is mixed with water, as necessary, and any other conventional processing aid. Mixing is by intensive shearing or mulling until the proper consistency and uniformity are obtained. The mixture is then extruded through a die plate having orifices of varying sizes consistent with the mittent manner. The strands may be cut into desired Generally the orifice size is in the range of $\frac{1}{32}''$ or $1''$. The extrudates are obtained in the form of strands in continuous extrusion or in the form of short cylinders or other shapes when extrusion is conducted in intermittent manner. The stands may be cut into desired lengths in conjunction with the extrusion procedure.

The process of extrusion carried out determines whether or not the extrudate will exhibit an increase in total porosity or will exhibit an increase in pore size at a given level of total porosity, i.e. an improvement in oil penetration. In order to control the extrusion step properly, it is first necessary to ascertain what level of total porosity is provided by the extrusion mix prepared in conventional manner, i.e. by standard procedure without use of surface active agent. As additional basic information, it is necessary to determine to what extent a given usage level of a specific surface active agent provides increased total porosity. Then by varying the processing conditions of the extrusion mix or its volatile content, or both, while maintaining the given usage of surface active agent, it is possible to provide extrudates which at the conventional level of total porosity have improved oil penetration, i.e. porosity wherein greater amounts of larger pores are present.

Generally, longer periods of intensive shearing or mulling will reduce the level of porosity increase effected by the use of surface active agent. Certain volatile additives, such as ammonia, employed in conventional extrusion mixes tend to increase porosity to some extent and elimination thereof in conjunction with the use of surface active agents will also reduce the level of porosity increase effected by the use of surface active agents. As will be subsequently illustrated in the examples, surface active agents effected greatest increases in porosity in those extrusion mixes having high volatile contents, particularly high water contents. Accordingly, to reduce the porosity increases effected by surface active agents, advantage can be taken of this fact by restricting water usage in preparing the extrusion mix. Thus, by employing one or more of the measures indicated, the total porosity obtained in the extrudate can be controlled so as to provide the necessary relationships between total porosity, density, crush strength, and oil penetration to suit the needs of the particular utility for which the extrudate is to be prepared.

Thus, if total porosity is the prime requirement, extrusion mix processing will avoid those measures which minimize pore volume increases. On the other hand, if oil penetration is desired in an extrudate which upon conventional processing provides adequate total porosity, the various measures indicated to control porosity increases should be employed in processing the extrusion mix. Finally, if a limited increase in total porosity is desired in conjunction with oil penetration, the same measures can be employed to a more limited extent and the total number of measures employed can be reduced to effect the desired result. It can be readily appreciated, therefore, that the present process is extremely versatile with respect to the improvement in porosity that it can effect in extrudates. Generally, mull times of about 15 minutes or less provide increases in total porosity of the extrudate obtained. Mull times in excess of about 15 minutes generally reduce the increase in total porosity obtainable. Mull times of 25 minutes or greater may result in increased pore diameter without increase in total porosity.

Following extrusion, the extrudates obtained are subjected to conventional drying and calcining procedures to obtain the desired catalyst bases of improved porosity. Drying is preferably carried out in stages, removing portions of the volatile content in various stages. Calcining in general is carried out at a temperature of about 1000° F. or higher for time periods of about an hour or more, with less time required at higher temperature. Generally, the temperature does not exceed about 1500° F. since adverse effects on structure may occur at excessive temperatures.

The process of the present invention provides extruded catalyst materials of improved porosity over conventional extrudates of similar materials. The present invention provides the improved porosity while reducing shrinkage of the extrudate during drying and calcining. The process can be employed to provide formed catalyst material of greatly increased porosity, of larger average pore diameter at a given level of porosity, or of a combination of increased porosity with increased pore diameters. Increased porosity in some instances results in improved catalyst performance. In other instances, increased pore diameter is necessary to improve catalyst performance and provide necessary oil penetration. The present process, by providing either of these alternatives as well as catalyst materials wherein both total pore volume and average pore diameter are improved, is a highly useful process providing notable advances in the art.

The invention is more fully illustrated by the examples which follow wherein all parts and percentages are by weight unless otherwise specifically designated.

EXAMPLE A

Preparation of alumina powder

Twelve hundred thirty (1230) gallons of deionized water was charged to a turbine-agitated 3,000 gallon tank and heated to 90° F. Two hundred forty two (242) gallons of 28% $Al_2O_3$ sodium aluminate solution and 4,780 pounds of 7.6% $Al_2O_3$ alum solution were simultaneously added to the tank over a 60 minute period with the rate of alum flow controlled to maintain the tank pH at 7.5–8.0. When the aluminum sulfate solution was exhausted, sodium aluminate addition was continued until the mix pH had reached 10.6, the mixture containing about 6.9% of precipitated alumina at pH 10.6.

Following the 30 minute age period, the slurry was fed to a rotary vacuum filter where it was filtered and washed with deionized water. The filter cake was then repulped with deionized water and the pH was adjusted to 7.5–8.0 by adding nitric acid. A second filtration washing operation was carried out in which the filter cake was washed with deionized water containing 0.1% $NH_3$. The two stages of washing produced an alumina cake with low $Na_2O$ and sulfate content which was then mixed with deionized water to produce a pumpable slurry with an alumina content of 15%.

The alumina slurry was spray dried, with a dryer outlet temperature of 235° F., to produce an alumina powder with the following properties: weight loss on ignition =25%, pore volume "as-is"=0.80 cc./gm., bulk density "as-is"=0.30 gm./cc., percent minus 325 mesh=10, percent minus 200 mesh=35, percent minus 10 mesh=80.

EXAMPLE B

Preparation of extrusion mix

Thirty four and one-half pounds of the alumina powder prepared in Example A above was mixed with 36 pounds of water in an intensive mixer. The volatile content of the mix at the end of the mixing period was 61.9%. Portions of this mix were employed in preparing extrudates in subsequent examples.

EXAMPLE C (COMPARATIVE)

Five pounds of the mix prepared in Example B above were extruded using a conventional screw type machine equipped with a die plate having ⅛ inch diameter orifices. The extruded strands were collected, oven dried at 250° F. and then calcined for one hour at 1100° F. Properties of the calcined extrudates and conditions of extrusion are given in Table I.

EXAMPLE 1

The procedure of Example C was followed except that prior to extrusion there was added to the five pound sample of extrusion mix a solution of 8.0 grams of a nonionic surface active agent of the polyoxyalkene fatty ester type designated I, in 152 grams of water. The modified mix was mixed well and then extruded.

EXAMPLE 2

The procedure of Example 1 was repeated except that the amount of surfactant employed was 24 grams dissolved in 136 grams of water.

EXAMPLE 3

The procedure of Example 1 was again followed except that the amount of surfactant employed was 40 grams dissolved in 120 grams of water.

EXAMPLE 4

The procedure of Example C was followed except that prior to extrusion there was added to the extrusion mix a solution of 8.0 grams of a nonionic surface active agent designated as a lauric acid-diethanolamine condensate and II in 152 grams of water. The modified mix was mixed well and then extruded.

EXAMPLE 5

The procedure of Example 4 was repeated except that the amount of surface active agent employed was 24 grams dissolved in 136 grams of water.

EXAMPLE 6

The procedure of Example 4 was repeated except that the amount of surface active agent employed was 40 grams dissolved in 120 grams of water.

EXAMPLE 7

The procedure of Example C was followed except that prior to extrusion there was added to the extrusion mix a solution of 8 grams of an anionic surface active agent designated as di(2-ethylhexyl) sodium sulfosuccinate dissolved in 152 grams of water. The modified mix was mixed well and then extruded.

EXAMPLE 8

The procedure of Example 7 was repeated except that the amount of surface active agent employed was 24 grams dissolved in 136 grams of water.

EXAMPLE 9

The procedure of Example 7 was repeated except that the amount of surface active agent employed was 40 grams dissolved in 120 grams of water.

TABLE I.—EXTRUSION CONDITIONS AND EXTRUDATE PROPERTIES

| Surfactant type | Percent[1] | Ex. | Extrusion rate, lbs. min. | Pore volume, cc./g. | Diameter inches | Surface area square meters/g. | Crush strength,[2] lbs. |
|---|---|---|---|---|---|---|---|
| None | 0 | C | 2.5 | .805 | .1269 | 333 | 1.2 |
| Nonionic | 1 | 1 | 2.2 | .900 | .1275 | 348 | 16.2 |
| Do | 3 | 2 | 2.1 | .940 | .1299 | 315 | 12.8 |
| Do | 5 | 3 | 2.1 | .950 | .1299 | 328 | 11.2 |
| Nonionic II | 1 | 4 | 2.2 | .900 | .1295 | 331 | 11.3 |
| Do | 3 | 5 | 2.5 | .990 | .1297 | 307 | 13.7 |
| Do | 5 | 6 | 2.5 | 1.00 | .1298 | 331 | 12.1 |
| Anionic | 1 | 7 | 2.6 | .915 | .1290 | 352 | 16.9 |
| Do | 3 | 8 | 2.5 | .960 | .1294 | 332 | 11.4 |
| Do | 5 | 9 | 2.3 | 1.02 | .1311 | 335 | 10.2 |

[1] Based on $Al_2O_3$ content of mix.
[2] Average for extrudate sample of length=⅛″.

The data of Table I show that extrusion rate and calcined extrudate surface area were not affected by the additions of surface active agents. The effect of surface active agent on shrinkage of the extrudate upon drying and calcining is indicated by pore volume and extrudate diameter. The increase in pore volume obtained by addition of surfactants was similar for nonionic agent II and anionic agent and slightly less for nonionic agent I. Crush strength although decreased by addition of surfactant, is highly satisfactory for all samples.

EXAMPLE D

Three hundred fifty pounds of deionized water was charged to a 375 gallon tank and heated to 90° F. Filter hundred thirty four pounds of 28% $Al_2O_3$ sodium silicate solution and 750 pounds of 6.9% $Al_2O_3$ aluminum sulfate (alum) were added simultaneosly to the tank over a 60 minute period with the rate of alum flow controlled to maintain the mix pH at 7.5–8.0. When the alum was exhausted, sodium aluminate flow was continued until the mix pH reached 10.0. The mix containing about 11.8% of precipitated alumina was aged for about 50 minutes at pH 10.0. Following the age period, the slurry was fed to a rotary vacuum filter where it was filtered and washed with deionized water. The washed cake was then repulped with deionized water and adjusted to pH 7.5–8.0 with nitric acid. This slurry was then subjected to a second filtration washing operation and a washed cake with an $Al_2O_3$ content of 18.4% and low $Na_2O$ and sulfate content was recovered.

One hundred parts of the 18.4% alumina cake described above was slurried with 80 parts of water and after adjusting the slurry pH to 5.5–6.0 with ammonium hydroxide, 19.2 parts of a 1% solution of a polyacrylamide flocculant and 40 additional parts of water were added. The polyacrylamide solution was added to flocculate the alumina and thus improve subsequent filtration, and also to increase the viscosity of the filtered and dried slurry. Water was added to the slurry mix to assist in dispersion of the flocculant throughout the slurry. The flocculated alumina slurry was then filtered producing a cake with an alumina content of 15.9%. This cake was oven dried to an alumina content of approximately 30% with mixing to ensure homogeneity. The partially dried cake was then extruded using a conventional screw-type machine. The extruded strands were collected, dried at ambient conditions and calcined at 1100° F. for one hour. The calcined particles had a pore volume of 0.56 cc. per gram.

EXAMPLE E

Twenty five parts of the 18.4% alumina cake described in Example D above were slurried with 5 parts of water and the slurry pH was adjusted to 5.5–6.0 with ammonium hydroxide. This slurry was then divided into three parts.

EXAMPLE 10

To 10 parts of the slurry of Example E were added 0.068 parts of a 25% aqueous solution of di(2-ethylhexyl) sodium sulfosuccinate 1.7 parts of a 1% solution of a polyacrylamide flocculant, and 2 parts of water. The flocculated slurry was then filtered to provide a cake of alumina content 17.3%. The cake was then dried, with mixing to ensure homogeneity, to an alumina content of 30%. The partially dried cake was then extruded using a conventional screw-type machine. The extrudates were collected, dried at ambient conditions, and calcined at 1100° F. for 1 hour. Results are summarized in Table II below.

EXAMPLE 11

The procedure of Example 10 was repeated except that in place of the surface active agent employed therein, there was substituted 0.017 part of a nonionic surface active agent designated as a polyoxyalkene fatty acid ester type and I.

EXAMPLE 12

The procedure of Example 10 was repeated except that in place of the surface active agent employed therein, there was substituted 0.017 part of a nonionic surface active agent designated as a lauric acid diethanolamine condensate and II.

TABLE II

| Example | Surface active agent | Percent [1] | Pore Volume (cc./g.) |
|---|---|---|---|
| D | None | 0 | 0.56 |
| 10 | Anionic | 1 | 0.81 |
| 11 | Nonionic I | 1 | 0.805 |
| 12 | Nonionic II | 1 | 1.15 |

[1] Based on $Al_2O_3$ content of mix.

The above data show that the various types of surface active agents are highly effective in increasing pore volume when used in an extrusion mix with high volatile content, which mix would otherwise yield extrudates with relatively low porosity. The increases in porosity in Table II are relatively higher than those given in Table I, wherein less volatiles are present in the extrudates being subjected to drying and calcining, thus supporting the view that the effect of surface active agents is greatest when shrinkage predominates as the factor controlling density. In the results reported in Table II, nonionic agent II produces the greatest increase in porosity.

EXAMPLE 13

The procedure of Example C was followed except that prior to extrusion there was added to the extrusion mix a solution of 8.0 grams of a cationic surface active agent designated as stearamidopropyl, dimethyl, β-hydroxyethyl, ammonium chloride in 152 grams of water. The modified mix was mixed well and then extruded. The extrudate obtained showed properties similar to that of Example 1.

EXAMPLE 14

The procedure of Example C was followed except that prior to extrusion there was added to the extrusion mix a solution of 8 grams of an amphoteric surface active agent designated as lauramidopropyl, dimethyl, 2-carboxyethyl, ammonium inner acetate in 152 grams of water. The modified mix was mixed well and then extruded. The extrudate obtained showed properties similar to that of Example 1.

EXAMPLE 15

The procedure of Example 10 was repeated except that in place of the surface active agent employed therein, there was substituted 0.17 part of a 10% aqueous solution of a cationic surface active agent designated as stearamidopropyl, dimethyl β-hydroxyethyl, ammonium chloride. The extrudate obtained showed similar properties to that of Example 10.

EXAMPLE 16

The procedure of Example 10 was repeated except that in place of the surface active agent employed therein, there was substituted 0.17 part of a 10% aqueous solution of an amphoteric surface active agent designated as lauramidopropyl, dimethyl, 2-carboxyethyl, ammonium inner acetate. The extrudate obtained showed similar properties to that of Example 10.

EXAMPLE F

To a turbine-agitated tank containing a water heel, separate streams of sodium aluminate (23% $Al_2O_3$) and aluminum sulfate-water (5.8% $Al_2O_3$) were simultaneously added. The quantities of alum, sodium, aluminate, and water were controlled to produce a final slurry with an $Al_2O_3$ content of 7%. The rates of addition were controlled to maintain the tank pH at 7.5–8.0 and the temperature was regulated to approximately 95° F. Toward the end of the precipitation, the flow of sodium aluminate was continued to raise the pH to 10.0–10.5, at which pH the slurry was aged for ½ hour.

The aged slurry was then filtered on a vacuum filter and was washed with three displacements of water. The washed cake was repulped with additional water to a solids content of 7% and the pH was adjusted to 7.0 with nitric acid. The adjusted slurry was aged for about ½ hour, dewatered and washed.

The washed cake was then spray dried with a gas outlet temperature of 275° F. to produce a powder an $Al_2O_3$ content of approximately 75% and an Apparent Bulk Density of approximately 0.32 gram per cc.

EXAMPLE G (COMPARATIVE)

The following ingredients were charged to a mix-muller in the order designated: (1) 440 pounds of alumina powder prepared in Example F above; (2) 150 pounds of hydrous alumina slurry, which is obtained in the procedure of Example F above immediately prior to spray drying, i.e. the washed cake; (3) a mixture of 200 pounds of water, 220 pounds of ammonium molybdate solution (28% $MoO_3$ and 2.85% $NH_3$), and 25 pounds of ammonium hydroxide solution (11% $NH_3$); and (4) 80 pounds of cobalt nitrate solution (16% CoO). The mix-muller was operated during addition of the ingredients (ca. 5 minutes) and continued thereafter to a total mix time of 15 minutes. The mulled mix was then fed to a conventional auger type extruder to produce strands which were dried at 250° F. in a conveyor dryer and then calcined in an indirect-fired calciner at 1050° F. Properties of the calcined product, which was in the form of 0.037" diameter cylinders, are listed in Table III.

EXAMPLE 17

The following ingredients were charged to a mix-muller in the order designated: (1) 440 pounds of alumina powder prepared in Example F above; (2) 150 pounds of alumina slurry, which is obtained in the procedure of Example F above immediately prior to spray drying, i.e., the washed cake; (3) a mixture of 220 pounds of water, 220 pounds of ammonium molybdate solution (28% $MoO_3$ and 2.85% $NH_3$), and 2 pints of the lauric acid amide of diethanolamide; and (4) 80 pounds of cobalt nitrate solution (16% CoO). The mix-muller was operated during the addition of ingredients (ca. 5 minutes) and continued thereafter to a total mix time of 30 minutes. The mulled mix was then processed to product as in Example G. Properties of the product are also listed in Table III.

TABLE III

| No | Total pore volume, cc./g. | Oil penetration [1] | | |
|---|---|---|---|---|
| | | 90%, percent | Average, percent | 10%, percent |
| G | 0.90 | 41.5 | 17.5 | 40.0 |
| 17 | 0.88 | 92.5 | 96.0 | 0 |

[1] Determined by the method described in U.S. Pat. No. 3,630,888, Dec. 28, 1971, Alpert et al. The average value reported is that obtained on a number of catalyst particles. The value under the heading 90%, %, represents that fraction of the total number of catalyst particles tested which exhibited oil penetration in excess of 90%. The value under the heading 10%, percent, represents that fraction of the total number of catalyst particles tested which exhibited oil penetration of less than 10%.

The data in Table III indicate the beneficial effect of the addition of surface active agent. The product of Example 17, despite slightly lower total porosity, has far better oil penetration. Note that the mix of Example 17 differed from that of Example G in two respects. In Example G ammonium hydroxide was an ingredient in the mix and the mix time was relatively short. Both the ammonium hydroxide addition and short mix time favor high total pore volume and were needed in Example G to obtain sufficient porosity. In Example 17, to counteract the effect of the surface active agent and thus avoid excessive high porosity, the mix time was extended and the ammonium hydroxide additive was omitted.

I claim:

1. In a process for preparing an alumina extrudate which includes the steps of forming a hydrous alumina, filtering and washing the alumina, partially drying the washed alumina, preparing an extrusion mix of the partially dried alumina, extruding the extrusion mix thus prepared, and thereafter drying and calcining the extrudates, the improvement which comprises adding to the alumina being processed from about 0.5 to 10%, by weight, based on weight of alumina ($Al_2O_3$), of a water soluble surface active agent of the cationic, anionic, nonionic, and amphoteric types, said addition being made at a point subsequent to washing but prior to extruding the alumina.

2. The process of claim 1 wherein the alumina is partially dried by spray drying and the surface active agent is added subsequent to said drying.

3. The process of claim 1 wherein the alumina is partially dried by oven drying and the surface active agent is added prior to said drying.

4. The process of claim 3 wherein the washed alumina is slurried in water to which is added the surface active agent and the thus-modified alumina is flocculated and filtered to form a cake prior to partial drying.

5. The process of claim 2 wherein the surface active agent is used in the amount of 1 to 5%, by weight, based on the weight of alumina.

6. The process of claim 3 wherein the surface active agent is used in the amount of 1 to 5%, by weight, based on the weight of alumina.

7. The process of claim 2 wherein the extrusion mix is prepared by mix-mulling for a total time of up to about 15 minutes so as to obtain increased total porosity in the final extrudate.

8. The process of claim 2 wherein the extrusion mix is prepared by mix-mulling for a total time of 25 minutes or more so as to obtain increased oil penetration at a given level of porosity.

9. The process of claim 8 wherein the surface active agent is a nonionic agent.

References Cited
UNITED STATES PATENTS
3,679,605   7/1972   Sanford et al. _____ 252—463

DANIEL E. WYMAN, Primary Examiner
P. F. SHAVER, Assistant Examiner

U.S. Cl. X.R.
252—477 R

UNITED STATES PATENT OFFICE
CERTIFICATE OF CORRECTION

Patent No. 3,804,781   Dated April 16, 1974

Inventor(s) Joseph Dennis Colgan

It is certified that error appears in the above-identified patent and that said Letters Patent are hereby corrected as shown below:

Column 8, Table I, under the heading crush strength$^2$, lbs. "1.2" should be -- 17.2 --; Column 8, line 75, the word "Filter" should be -- Four --.

Signed and sealed this 26th day of November 1974.

(SEAL)
Attest:

McCOY M. GIBSON JR.
Attesting Officer

C. MARSHALL DANN
Commissioner of Patents

Notice of Adverse Decision in Interference

In Interference No. 99,013, involving Patent No. 3,804,781, J. D. Colgan, EXTRUDED ALUMINA CATALYST SUPPORTS, final judgment adverse to the patentee was rendered Mar. 2, 1977, as to claims 1 and 3.

[*Official Gazette July 5, 1977.*]